Feb. 9, 1932.  O. L. COGGIN  1,844,032
TEMPLATE CUTTING MACHINE
Filed March 3, 1930  3 Sheets-Sheet 2
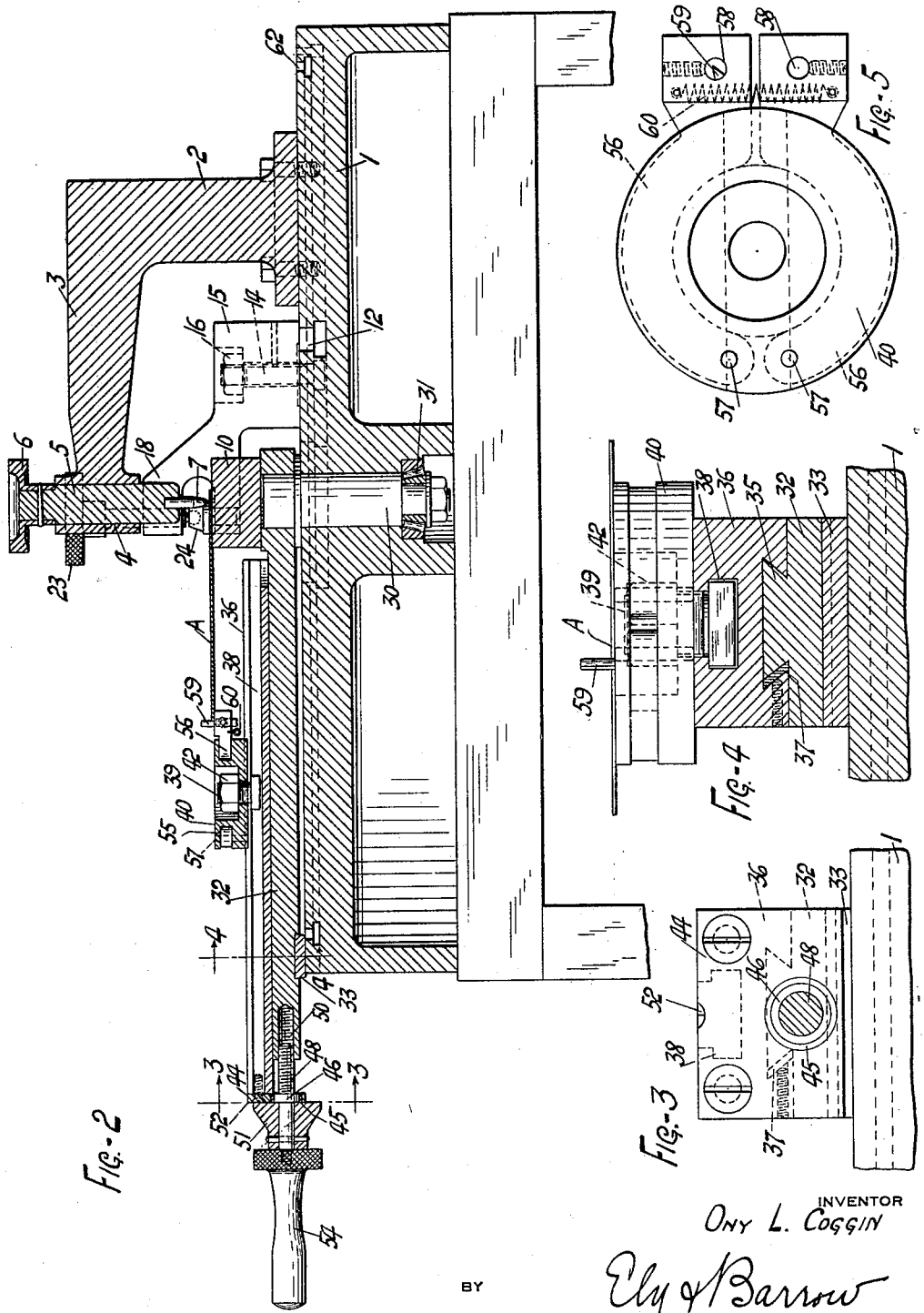
INVENTOR
Ony L. Coggin
BY Ely & Barrow
ATTORNEYS Feb. 9, 1932.   O. L. COGGIN   1,844,032
TEMPLATE CUTTING MACHINE
Filed March 3, 1930    3 Sheets-Sheet 3

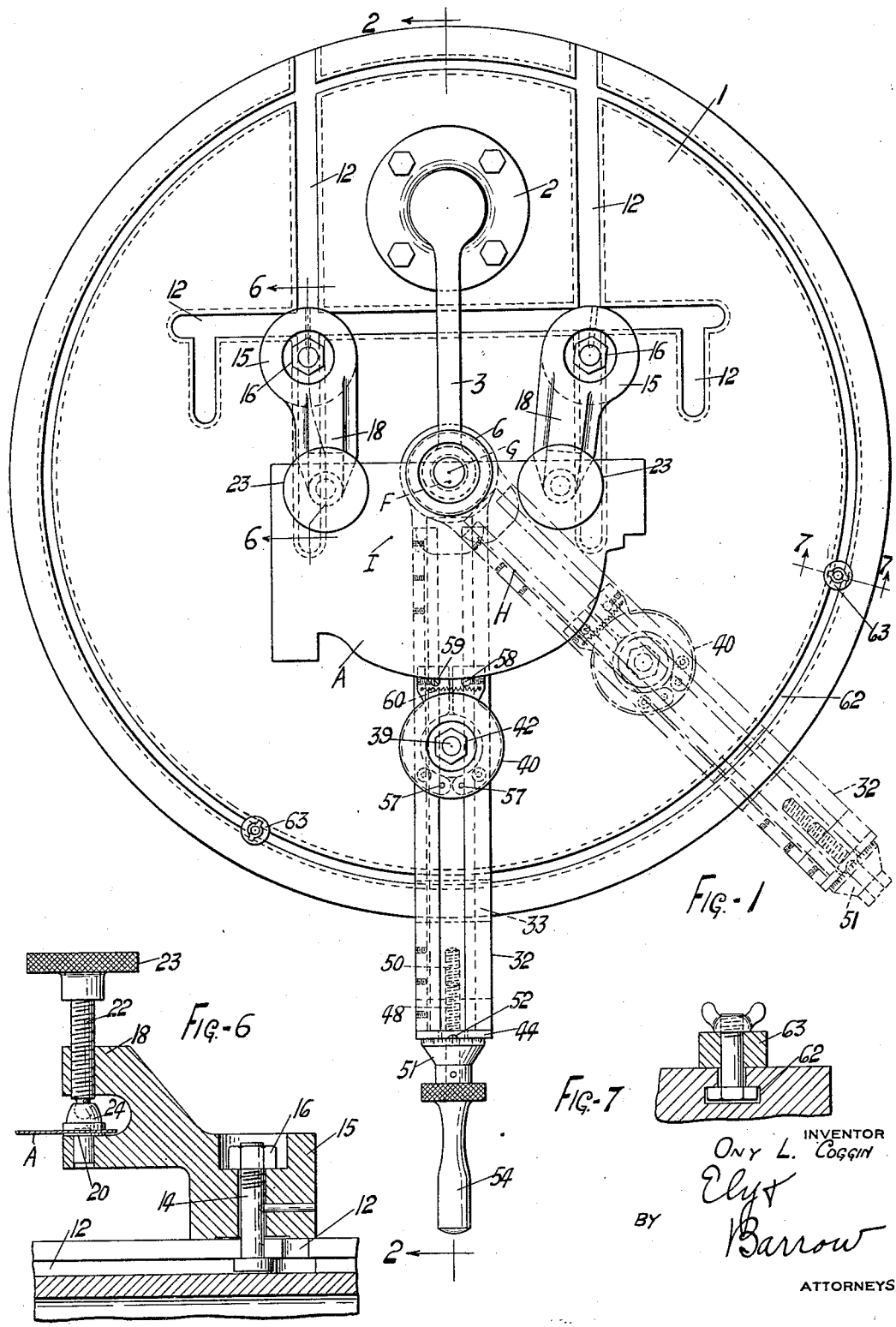

INVENTOR
ONY L. COGGIN
BY  Ely & Barrow
ATTORNEYS

Patented Feb. 9, 1932

1,844,032

UNITED STATES PATENT OFFICE

ONY L. COGGIN, OF AKRON, OHIO, ASSIGNOR TO NATIONAL RUBBER MACHINERY COMPANY, OF AKRON, OHIO, A CORPORATION OF OHIO

TEMPLATE CUTTING MACHINE

Application filed March 3, 1930. Serial No. 432,746.

The present invention has for its object the design and construction of an improved machine for the accurate cutting of plates or gages. It is particularly designed for the cutting of templates, such as used for example in gaging and truing tire molds, and the invention will be described for that particular purpose, although it is not confined to such operations.

In the cutting or finishing of molds for the curing of pneumatic tires it is the custom to make templates of the cross section of the completed tire mold section, and these templates are required to be accurately made to exact dimensions and form to meet the specifications required by the purchaser of the completed mold. These templates, which are of the contour or profile of the mold cavity are usually cut or formed upon a number of radii, the position and radii of which are accurately determined.

Heretofore, these templates have been cut by hand, which is extremely laborious and requires great care and attention and in addition the finished template is oftentimes inaccurate and irregular. In the prior practices the finishing of the template is done by hand filing after a rough cut has been taken and owing to the unsteadiness of hand operation the results are not satisfactory at all times.

The present invention obviates the hand labor and by the use of the device here shown and described, more accurate and exact results are obtained, and in addition the time and expense of cutting the templates are reduced, so that the work is done more cheaply and with better results than by the hand operation heretofore in use.

The principles of the invention may be applied to other uses and the invention is not necessarily limited or confined to exact conformity with the detailed design of the apparatus. Changes and modifications may be made and improvements are possible in final designs of the machine for the purposes specified herein and the claims are to be construed so as to cover such variations in the design as may be permissible within the fair scope thereof.

In the drawings, in which the best known or preferred form of the invention is shown and described;

Figure 1 is a plan view of the machine at one setting with a template mounted in the machine ready for the final cutting or finishing operations which are performed upon the machine;

Figure 2 is a central vertical section on the line 2—2 of Figure 1;

Figure 3 is a section on the line 3—3 of Figure 2;

Figure 4 is a section on the line 4—4 of Figure 2;

Figure 5 is an enlarged plan view of the tool holder;

Figure 6 is a section on the line 6—6 of Figure 1 taken through the work clamp;

Figure 7 is a section on the line 7—7 of Figure 1 on the stop device;

Figure 8:
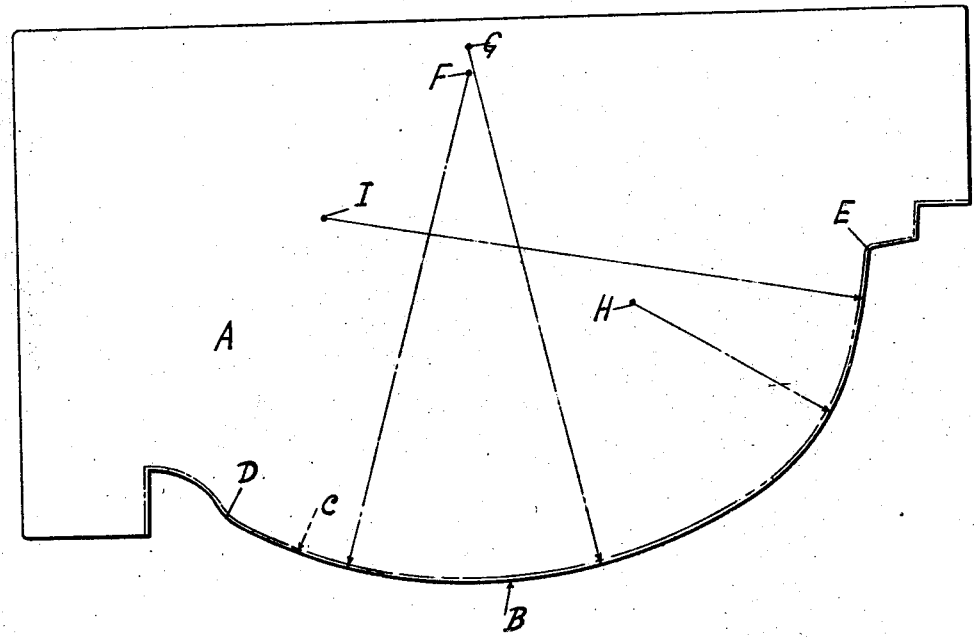
Figure 8 is a view of a template adapted to be cut upon the machine showing the rough cut and the finishing cut done upon the machine.
Figure 9:
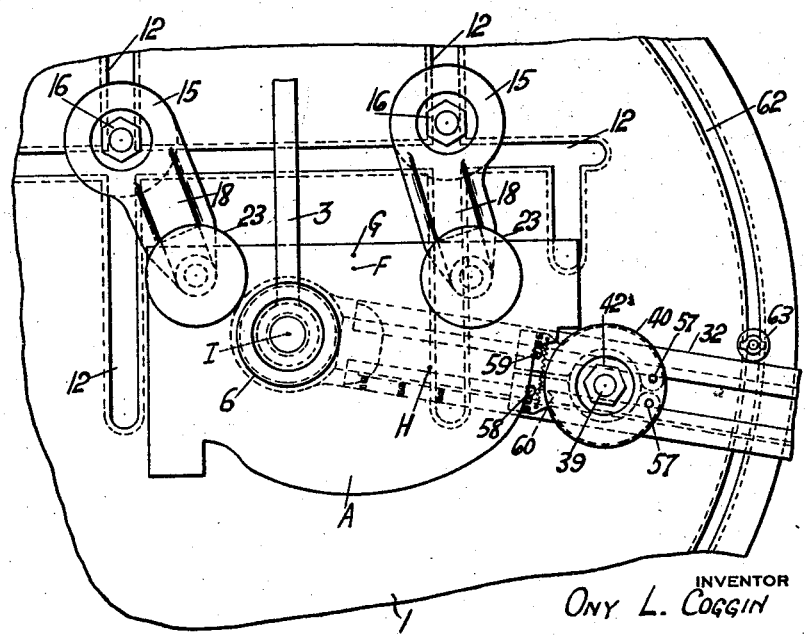
Figure 9 is a fragmentary plan showing the setting of the machine for a different cut from that shown in Figure 1.

A template or gage for the purposes set forth is indicated at A and as shown by the full line B in Figure 8 is rough cut to approximately the shape desired. The final or finishing cut is shown at C, this line indicating the work to be done upon the machine. The extent of the finishing cut as to be made on this machine is from the point D to point E, and as shown, this is upon a plurality of radii with the successive centers F, G, H and I, extending from the base to the top of the template. Each of these centers is accurately located and indicated by a punch mark upon the template. In Figure 1 the cutting operation being performed at the setting shown, is from the center G. In Figure 9 the cutting is from the center I.

The machine is supported upon a circular bed plate or table 1 at one side of which is fixed the bracket 2, the horizontal arm 3 of which extends over the bed plate and is formed with a vertical bearing 4 at approximately the center of the bed plate. Closely fitted within the bearing 4 is the vertical post 5 having a knurled hand wheel 6 upon its upper end. In its lower end the post is provided with a close pin 7 press fitted therein, the end of the pin being sharpened and adapted to engage one of the centers F, G, H and I according to the setting of the machine. Beneath the pin 7 is the spacer block 10 which supports the template at this point.

In the face of the bed plate are provided a plurality of slide ways 12, here shown as composed of various intersecting units which provide an ample range of adjustment for the template clamps to be described. These slide ways are preferably formed with overhanging edge portions, and slidably received in said ways is the head of a bolt 14 which passes through a lamp block 15 resting upon the upper surface of the bed plate and held in fixed adjusted position by means of nuts 16. Any number of these work clamps may be provided, two being shown in the illustrated embodiment of the invention, one at each side of the center post. These clamp blocks have a wide range of adjustment and may be turned at any angle to engage the work to the best advantage.

On each clamp block is formed jaws 18, the lower side of which is provided with a hardened steel plate 20 upon which the template is placed. The opposite side thereof is provided with a screw shaft 22, having an operating hand wheel 23 at its upper end and a swiveled foot piece 24 at its lower end which, in conjunction with the plate 20 securely clamps the template in position. When the template is located the pin 7 is located at one of the centers as described.

In the bed plate, in vertical alignment with the pin 7 is the vertical shaft 30 having its lower end seated in the roller bearing 31. Upon its upper end, projecting above the table the shaft carries the radial arm or sweep 32 which projects out over the table, being supported on its outer end by the bearing piece 33, preferably composed of a fibre composition so that the arm will swing easily. The upper surface of the swinging arm is formed with a dovetailed rib 35 upon which is received the movable slide 36, an adjustable gib 37 insuring the accurate movement of the slide. The upper surface of the slide 36 is formed with the T-slot 38 in which is received the head of a bolt 39. A tool carriage 40 is mounted on the bolt and is held in its adjusted position upon the slide by the nut 42.

The first or primary adjustment of the tool carriage is secured by the location of the tool carriage on the slide, and the final adjustment is obtained by the adjustment of the slide, for which purpose there is secured to the outer end of the slide a plate 44 in which is located a bushing 45 to receive the bearing collar 46 on a shaft 48, the inner end of which is threaded to engage a socket 50 in the end of the slide. To the outer end of the shaft 48 is fixed the head 51, the perimeter of which is graduated to be read in conjunction with a mark or notch 52 on the plate 44. A handle 54 is secured to the outer end of the shaft by which it may be rotated to secure the fine adjustments and by which the arm may be moved on the center post 30 in making the cut.

The tool carriage 40 is circular and is provided with the horizontal slot or groove 55 in which are movable the two arcuate tool carrying arms 56 located on opposite sides of the carriage and pivoted at 57. At the opposite side of the carriage from the pivot points the arms are extended to provide sockets 58 in which the cutting tools 59 are secured. A light coil spring 60 extends across the arms tending to hold the arms normally in closed position. The object in providing two tool carrying arms is to permit each tool to cut in one direction, the arm yielding in its return movement to permit the tool to slide over the work.

Around the table is formed the circular track or groove 62 in which stops 63 may be located and fixed so as to limit the movement of the sweep. This feature is essential upon cutting certain of the radii, to prevent the tool from cutting into the metal of the template beyond the proper point.

In cutting the template the work is set in the clamps so that the point 7 is directly over one of the centers. Assuming that the radius G is to be cut first, the plate is clamped with the point G beneath the pin 7 as shown in Figure 1. The tool carriage is then adjusted to approximately the correct distance and then the accurate radius is obtained by the vernier adjustment through the screw 48. The surface is then cut with the tool in the left socket as shown in Figure 1, the cutting stroke being toward the left. When the cut is completed the tool is adjusted to the other radii. As shown in Figure 9 when cutting on the radius I the right hand tool socket is used and the cutting movement is to the right. The stops are used whenever necessary to prevent cutting into the work.

It will be seen that a very accurate and extremely simple apparatus or machine has been designed by which the cutting of templates is greatly improved and the machine is easily adapted and adjusted to the work. The time saved and the accuracy obtained make the invention extremely valuable in this particular art and the principles and benefits thereof may be extended to other uses. The showing of the machine is not intended to restrict the invention beyond a fair scope of equivalents and improvements.

What is claimed is:

1. In apparatus for the uses and purposes set forth, a bed plate, a plurality of clamps and means for fixing said clamps at various points on the bed plate, a bracket on the bed plate having a center point therein, a swinging arm pivoted at the center point, a tool carrier on the arm, said tool carrier being adjustable to varying distances from the center point.

2. In apparatus for the uses and purposes set forth, a bed plate, a plurality of clamps and means for fixing said clamps at various points on the bed plate, a bracket on the bed plate having a center point therein, a swinging arm pivoted at the center point, a tool carrier on the arm, said tool carrier being adjustable upon the arm to varying distances from the center point, and means for varying the length of said arm.

3. In apparatus for the uses and purposes set forth, a bed plate, a plurality of clamps on the bed plate, a bracket on the bed plate having a center point therein, a swinging arm pivoted at the center point, a tool carrier on the arm, said tool carrier being adjustable to varying distances from the center point.

4. In apparatus for the uses and purposes set forth, a bed plate, a plurality of clamps on the bed plate, a bracket on the bed plate having a center point therein, a swinging arm pivoted at the center point, a tool carrier on the arm, said tool carrier being adjustable upon the arm to varying distances from these center points, and means for varying the length of said arm.

5. Means for cutting a template or the like upon different radii with variously located centers, a swinging arm, a carriage upon the arm, means for adjusting the position of the carriage with respect to the axis of movement of the arm, means for securing respective reversely operative cutters upon the carriage, and means for clamping the work to bring the centers of the various radii selectively in register with the axis of the arm.

6. Means for cutting a template or the like upon different radii with variously located centers, a swinging arm, a carriage upon the arm, means for adjusting the position of the carriage with respect to the axis of movement of the arm and means for adjusting the length of said arm, means for securing respective reversely operative cutters upon the carriage, and means for clamping the work to bring the centers of the various radii selectively in register with the axis of the arm.

7. Means for cutting a template or the like upon different radii with variously located centers, a fixed center point, means for clamping the work with the centers of the radii selectively at the fixed center point, a swinging arm movable upon an axis in alignment with the center, and a cutter upon the arm.

8. Means for cutting a template or the like upon different radii with variously located centers, a fixed center point, means for clamping the work with the centers of the radii selectively at the fixed center point, a swinging arm movable upon an axis in alignment with the center, a cutter upon the arm, and means for adjusting the position of the cutter upon the arm.

9. Means for cutting a template or the like upon different radii with variously located centers, a fixed center point, means for clamping the work with the centers of the radii selectively at the fixed center point, a swinging arm movable upon an axis in alignment with the center, a cutter upon the arm, a rough adjustment and a fine adjustment operative to locate the cutter at different distances from the axis of rotation of the arm.

ONY L. COGGIN.